Inventors:
Lars Evald Holger Larsson
Karl Erik Nicolaus Rydström
by W. Bayard Jones
Attorney

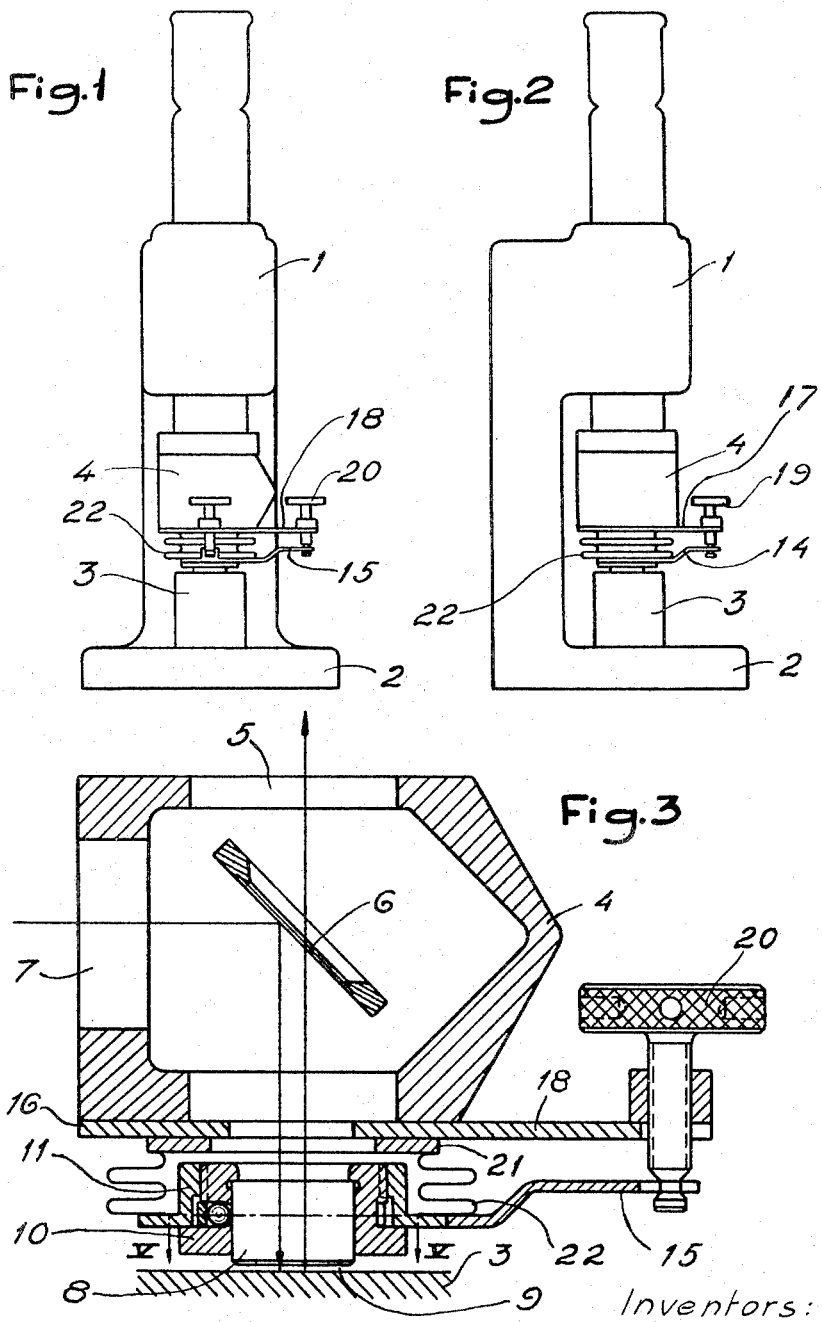

2,743,645

INTERFEROMETRIC APPARATUS FOR EXAMINING THE STRUCTURE OF REFLECTING SURFACES

Lars Evald Holger Larsson and Karl Erik Nicolaus Rydström, Eskilstuna, Sweden, assignors to Aktiebolaget C. E. Johansson, Eskilstuna, Sweden, a Swedish company Application August 20, 1952, Serial No. 305,364

2 Claims. (Cl. 88—14)

The present invention relates to an apparatus for examining the structure of fine surfaces by interference measurement with the aid of an interferometric apparatus applicable to a microscope, said apparatus comprising an interference plate provided with a reflecting layer and which is adjustably attached to the apparatus in such manner that it may be adjusted at different angles to the surface to be examined. The invention is primarily intended to be used with such apparatus for the said purpose as are described in the patent application of Erik Paul Gerhard Ingelstam, Serial No. 268,965, filed January 30, 1952, now abandoned, and has for its purpose to provide for increased accuracy when making interference measurements. With this purpose in view the present invention is mainly characterized by there being provided, between the interference plate, or a holder for said plate, and the other part of the apparatus, a bellows made of an opaque material and which encloses the path of the light beam between the apparatus and the plate. In this way dust and sidelight are excluded from the said path and are thus prevented from disturbing the measurements. On the other hand, the bellows does not obstruct the adjustment of the interference plate by tilting it about two axes at right angles to one another, which is provided for in the apparatus according to the abovementioned prior patent application. The bellows may suitably be made of an elastic material, such as thin sheet metal, and it may simultaneously support the interference plate and its holder. In this way the interference plate is also resiliently supported in such manner that it is possible to obtain a variable and suitable contact pressure relatively to the test surface.

Figure 4:
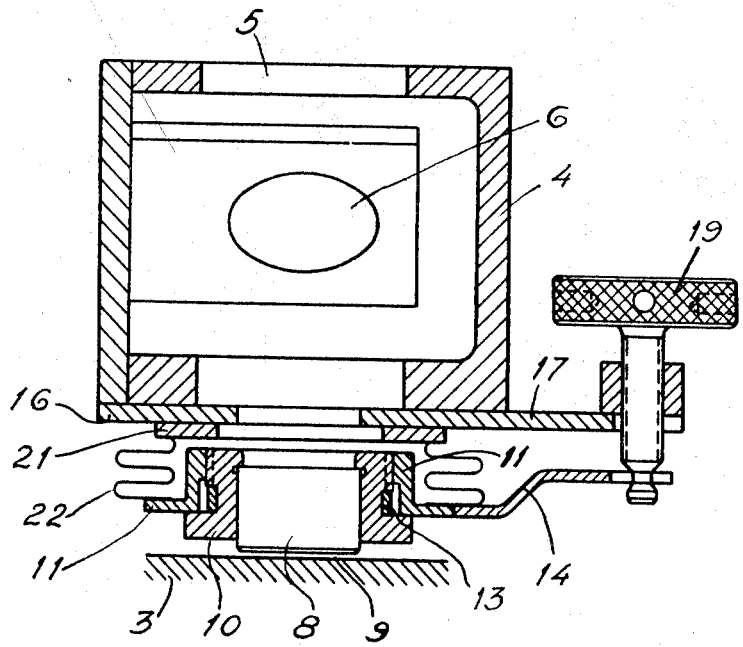
Figure 5:
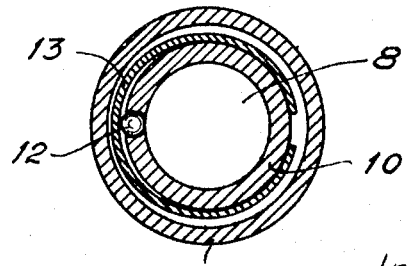

In the accompanying drawings a constructional form of the invention is illustrated by way of example. Fig. 1 shows a front view and Fig. 2 shows a side view of the interferometric apparatus attached to a microscope. Figs. 3 and 4 show to a larger scale two vertical sections, taken at right angles to one another, through the interferometric apparatus. Fig. 5 shows a section through the holder of the interference plate on the line V—V in Fig. 3.

In the constructional form illustrated, 1 denotes a microscope on the base plate 2 of which the test body 3, the surface of which is to be examined, is placed. The upper portion of the interferometric apparatus is shaped as a substantially cubical housing 4 the top of which is provided with an aperture 5 such that the housing can be attached to the microscope tube, as shown in Figs. 1 and 2. Provided in the housing 4 is a partly reflecting mirror 6 at an angle of 45° to the optical axis of the microscope tube. Light from a suitable light source, such as a sodium lamp, is projected through a side opening 7 in the housing 4 against the said mirror, and is partly reflected by the mirror upon the interference plate 8. The lower face of said plate which constitutes the upper interference surface, must be positioned in, or adjacent to, the plane to which the microscope is adjusted. The upper surface of the test body 3, the structure of which is to be examined, and which forms the lower interference surface, must be positioned very closely to the lower surface of the plate 8 and form a small angle to the plane of said surface, which result is attained by adjustment of the plate 8. In the wedge-shaped space 9 between the interference surfaces interference of the light rays passing through the plate 8 occurs, and the light is again projected against the mirror 6 through which a part of it passes to the microscope, so that the interference fringes produced can be observed through the eye-piece of the microscope.

The interference plate 8 which in the instance illustrated consists of a circular glass disk having, for instance, a thickness of 8 mm. and a diameter of 12 mm., is removably inserted in a holder which consists of two rings 10 and 11 screwed one into the other, the plate being retained in place by a ball 12, which is positioned in a radial opening in the inner ring 10, being forced against the side face of the plate by an arcuate spring 13. In this way the plate 8 is easily exchangeable. The outer holder ring 11 is provided with two radial arms 14 and 15 projecting from the ring at right angles to one another. Fixed or rotatably attached to the lower side of the housing 4 is a plate 16 which is likewise provided with two radial arms 17 and 18 projecting at right angles to one another, and which occupy positions above the arms 14 and 15, respectively. Screw-threaded into the outer ends of the arms 17 and 18 are screws 19 and 20, the free ends of which engage slots formed in the outer ends of the arms 14 and 15, so that it is possible by the aid of said screws to tilt the interference plate 8 about two axes at right angles to one another and thus to adjust the desired angle of the space 9.

Between the holder ring 11 for the plate 8 and a ring 21 secured to the lower face of the plate 16, is a bellows 22 of an opaque material, preferably thin sheet metal, the said bellows being resilient and supporting the interference plate with its holder 10, 11 in such manner that the abovementioned adjustment of the angle of the interference space 9 by means of the screws 19 and 20 is rendered possible. The said bellows encloses the path of the light beam between the housing 4 and the plate 8, and thus excludes dust as well as side-light from the said path and prevents them from disturbing the measuring operations. The arrangement is also very simple and may be cheaply manufactured.

What we claim as our invention is:

1. An interferometric apparatus for examining the structure of reflecting surfaces, comprising a support for the body having the surface to be tested, a housing, an interference plate made of a transparent material and having a reflecting and partly transparent layer, an open-ended bellows made of an opaque elastic material attached at one end to said housing, a holder for said interference plate attached to the other end of said bellows for allowing tilting movement of said interference plate relatively to said housing and thus for supporting said plate in such arbitrary position relatively to said support as to form an interference space between the reflecting and partly transparent layer on said interference plate and the surface to be tested on the body on said support, and means for projecting a beam of light from said housing into said interference space, said bellows enclosing the path of the light beam between said housing and said interference plate.

2. An interferometric apparatus for examining the structure of reflecting surfaces, comprising a housing, an interference plate made of a transparent material and having a reflecting and partly transparent layer, an open-ended bellows made of an elastic material attached at one end to said housing, a holder for said interference plate attached to the other end of said bellows for allowing tilting movement of said interference plate relatively to said housing and thus for supporting said plate in such arbitrary position relatively to the reflecting surface to be examined as to form an interference space between the reflecting and partly transparent layer on said interference plate and the reflecting surface to be examined, and means for projecting a beam of light from said housing into said interference space, said bellows enclosing the path of the light beam between said housing and said interference plate.

References Cited in the file of this patent

UNITED STATES PATENTS

| | | |
|---|---|---|
| 1,709,762 | Zworykin | Apr. 16, 1929 |
| 2,612,074 | Mirau | Sept. 30, 1952 |

FOREIGN PATENTS

| | | |
|---|---|---|
| 7,232 | Switzerland | Aug. 20, 1893 |